United States Patent [19]
Nakamura

[11] Patent Number: 5,172,923
[45] Date of Patent: Dec. 22, 1992

[54] TOOL CHUCK
[75] Inventor: Daijiro Nakamura, Ono, Japan
[73] Assignee: Kabushiki Kaisha Delta, Kobe, Japan
[21] Appl. No.: 859,837
[22] Filed: Mar. 30, 1992

[30] Foreign Application Priority Data
Apr. 8, 1991 [JP] Japan ................. 91/103806

[51] Int. Cl.$^5$ ............................. B23B 31/12
[52] U.S. Cl. .................... 279/62; 279/140; 279/157; 279/902
[58] Field of Search .............. 279/60-65, 279/140, 157, 902

[56] References Cited
U.S. PATENT DOCUMENTS
5,044,643 9/1991 Nakamura ............ 279/902 X FOREIGN PATENT DOCUMENTS
19705   1/1991 Japan .
136706  6/1991 Japan .
270809 12/1991 Japan .
281107 12/1991 Japan .
93103   3/1992 Japan .

Primary Examiner—Steven C. Bishop
Attorney, Agent, or Firm—Moonray Kojima

[57] ABSTRACT

A tool chuck has a plurality of inclined chuck claws mounted centrally of a forward end of a chuck body to be slidable toward and away from one another, a nut ring meshed with the chuck claws and rotatable to screw-feed the chuck claws toward and away from one another, and a torque amplifying mechanism interposed between the nut ring and a control ring fitted to an outer peripheral surface of the chuck body, whereby the control ring is turned directly by hand to cause the chuck claws to hold a tool. A torque limiter is incorporated into the torque amplifying mechanism for allowing the tool to be clamped by a force not exceeding a predetermined value. Excessive tightening of the tool is thereby avoided so that the tool is removable when desired, and at the same time the above torque limiter is formed compact.

4 Claims, 17 Drawing Sheets

F I G. 4
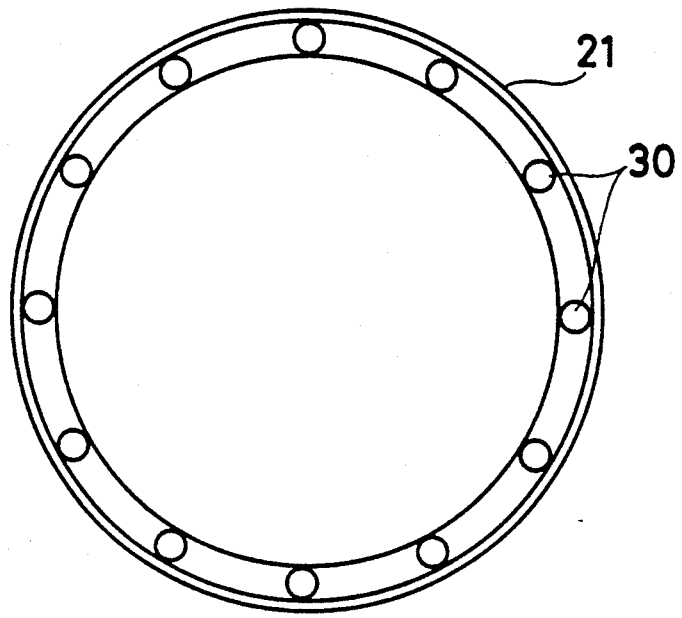

TOOL CHUCK

SUMMARY OF THE INVENTION

This invention provides a tool chuck having a plurality of inclined chuck claws mounted centrally of a forward end of a chuck body to be slidable toward and away from one another, a nut ring meshed with the chuck claws and rotatable to screw-feed the chuck claws toward and away from one another, and a torque amplifying mechanism interposed between the nut ring and a control ring fitted to an outer peripheral surface of the chuck body, whereby the control ring is turned directly by hand to cause the chuck claws to hold a tool. A torque limiter is incorporated into the torque amplifying mechanism for allowing the tool to be clamped by a force not exceeding a predetermined value. Excessive tightening of the tool is thereby avoided so that the tool is removable when desired, and at the same time the above torque limiter is formed compact.

FIELD OF THE INVENTION

This invention relates to tool chucks for holding various tools such as drill bits of power drills, driver bits of power drivers and the like, and more particularly to the type of tool chuck that may be tightened without using a chuck handle.

DESCRIPTION OF THE RELATED ART

With earlier tool chucks, tools are attached and detached by using a chuck handle. Applicant has already developed tool chucks which do not use a chuck key and yet realize a tightening force equivalent to the force applied by a chuck key. Such a tool chuck developed by Applicant includes a torque amplifying mechanism using a differential mechanism and interposed between a control ring mounted peripherally of the chuck and a nut ring mounted inside the chuck (as disclosed in Japanese Patent Applications Nos. 1989-154900, 1989-272935, 1990-67548, 1990-80395 and 1990-213245, for example).

The above tool chucks have proved to be of great utility in that, owing to the torque amplifying mechanism based on the differential mechanism, a sufficient tightening force is obtained from a manual operation (an operation to turn the chuck directly by hand) without using a chuck key. Meanwhile, a new problem has been encountered with such tool chucks that, when the chucks are tightened to excess for engaging tools, a strong force is required to release the tools because of the strong tightening force obtained through torque amplification. Thus, the chucks could become difficult to loosen by a manual operation.

OBJECTS OF THE INVENTION

A first object of this invention is to provide a tool chuck which holds a tool with a tightening force within a predetermined value to avoid excessive tightening and facilitate removal of the tool.

A second object of this invention is to provide a tool chuck which includes a torque limiter for avoiding excessive tightening, the torque limiter being formed using part of a torque amplifying mechanism, whereby the tool chuck has a simple construction with a small number of components, and is compact compared with a case of including a torque limiter independently of the torque amplifying mechanism.

A third object of this invention is to provide a tool chuck in which the above torque limiter may be set to a variable value to realize a proper tightening force according to a tool size.

A fourth object of this invention is to provide a tool chuck which is effective to avoid excessive tightening of a tool, and may be loosened with a sufficient force not limited by the torque limiter to release the tool reliably.

BRIEF DESCRIPTION OF THE DRAWINGS

FIG. 4 is a left side view of a first fixable ring.

DETAILED DESCRIPTION OF THE PREFERRED EMBODIMENTS (First Embodiment)

An embodiment of this invention will be described in detail hereinafter with reference to the drawings.

FIGS. 1 through 10 show a tool chuck in a first embodiment of the invention. This tool chuck is used with a power drill or a power driver for holding a tool such as a drill bit or a driver bit.

Figure 1:
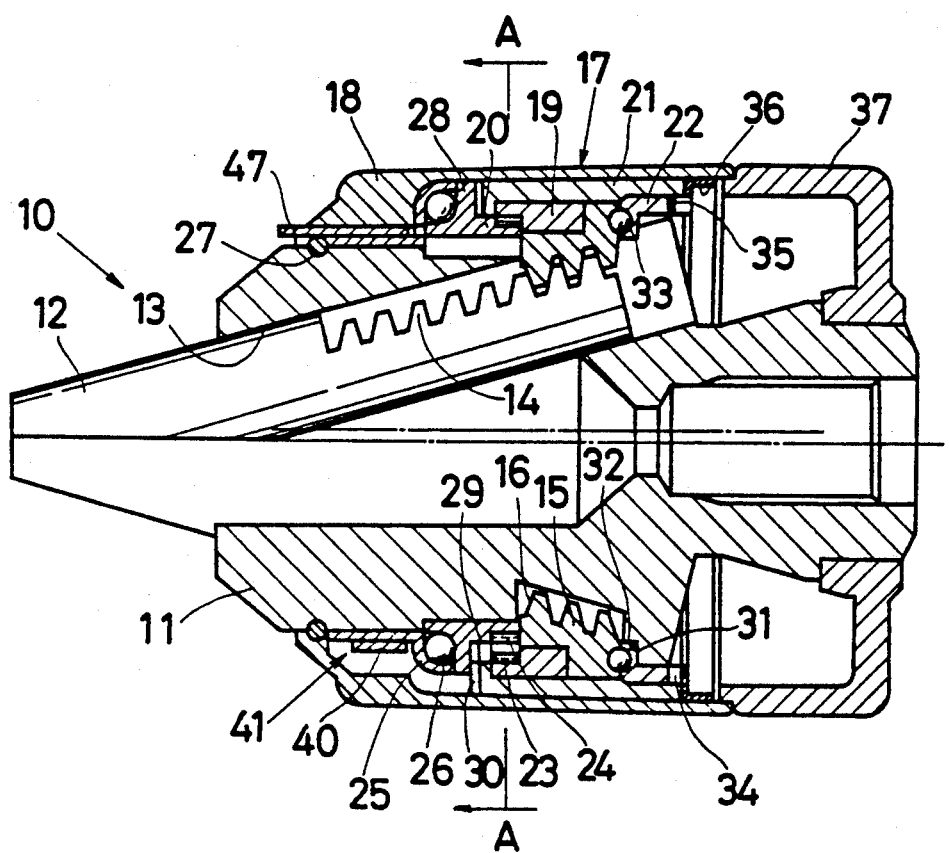
FIG. 1 is a sectional view of a tool chuck in a first embodiment of this invention.

Referring to FIG. 1, the tool chuck 10 comprises three chuck claws 12 slidably mounted centrally of the forward end of a chuck body 11. The chuck claws 12 are inclined with respective forward ends thereof converging toward the axis of the chuck body 11, and are slidable toward and away from one another.

More particularly, the chuck claws 12 are mounted only slidably in slide grooves 13 formed in the chuck body 11 as inclined relative to its axis, respectively. Each claw 12 defines a partial male screw 14 on a peripheral position thereof, with threads of the screw arranged to constitute a continuous whole. The respective partial male screws 14 are meshed with a female screw 16 defined in an annular nut ring 15. With turning of the nut ring 15 in opposite directions, the chuck claws 12 are slidable toward and away from one another for holding and releasing a tool.

A torque amplifying mechanism 17 is mounted peripherally of the nut ring 15, and a control ring 18 is mounted peripherally of the torque amplifying mechanism 17. When the control ring 18 is turned forward or backward, i.e. in a direction to tighten or release the tool 19, the torque is transmitted to the nut ring 15 through the torque amplifying mechanism 17.

The torque amplifying mechanism 17 is constructed as follows.

The mechanism 17 includes an output ring 19 press fit on and fixed to the nut ring 15, an input ring 20 relatively rotatably supported in the control ring 18 and off-centered by a predetermined amount of eccentricity e (FIG. 2), and a first and a second fixable rings 21 and 22 movable into pressure contact with a rearward position of the chuck body 11. These annular elements 19, 20, 21 and 22 are arranged axially of the chuck body 11.

The nut ring 15 consists of two parts which are rigidly interconnected by press fitting the output ring 19 after the two parts are assembled to the chuck body 11. The first and second fixable rings 21 and 22 are rigidly interconnected by mutual press fit.

Figure 2:
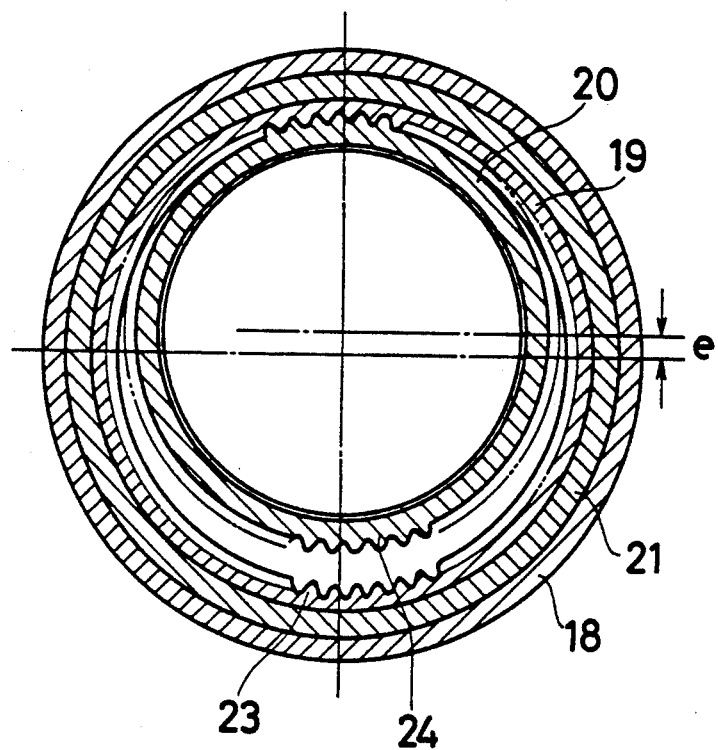
FIG. 2 is a section taken on line A—A of FIG. 1.

As also shown in FIG. 2, the output ring 19 has a forward end projecting forwardly of the nut ring 15, and the inner periphery of this projecting portion and the outer periphery of a rear end of the input ring 20 overlap each other in an eccentric relationship. These overlapping portions define cycloidal gears 23 and 24 having different numbers of teeth and meshed with each other. Both cycloidal gears 23 and 24 have teeth with rounded heads to smooth slips in the mutual engagement.

For example, the gear 23 on the output ring 19 has 65 teeth, while the teeth 24 on the input ring 20 has 61 teeth, the difference in the number of teeth being 4. Thus, these gears 23 and 24 constitute cycloidal gears for making a cycloidal movement.

When the control ring 18 is turned to apply only a revolving force to the input ring 20 (as locked against rotation) based on its eccentricity relative to the control ring 18, the output ring 19 will rotate by an amount corresponding to the greater number of teeth of the gear 23 formed thereon than the gear 24 formed on the input ring 20, the difference being 4 as noted above. This results in a substantial reduction of rotation of the control ring 18, which is outputted as a greatly increased torque from the output ring 19 in rotation.

Where, as described above, the difference in the number of teeth is 4 between the 65 teeth in the gear 23 formed on the output ring 19 and 61 teeth in the gear 24 formed on the input ring 20, the reduction ratio is expressed by the following equation:

$$(65-61)/61 = 4/61 = 1/15.25.$$

This is a large reduction ratio with respect to input, resulting in a greatly amplified torque output from the output ring 19.

The input ring 20 has a forward end peripherally contacting a bearing 26 enveloped in a support ring 25. Thus, the support ring 25 maintains the input ring 20 in the eccentric state.

Figure 3:
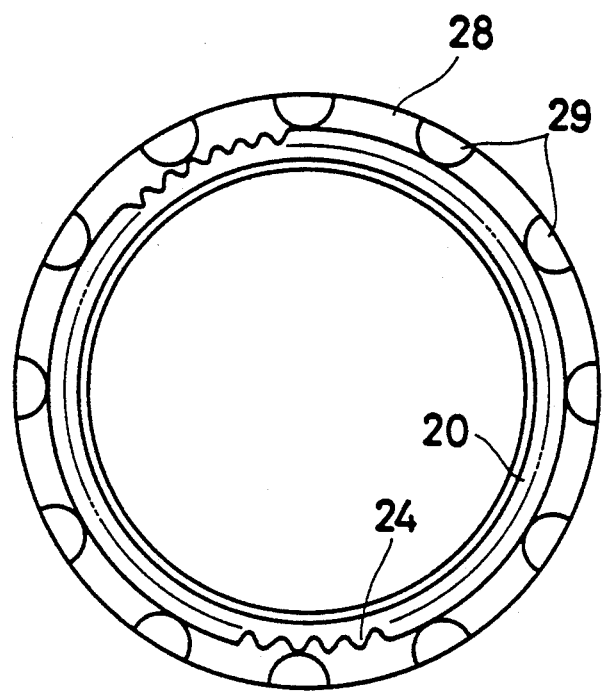
FIG. 3 is a right side view of an input ring.

As shown in FIG. 3, the input ring 20 includes a circumferential projection 28 formed on an outer surface thereof, and a plurality of engaging recesses 29 formed in a rear surface of the projection 28 and arranged circumferentially thereof.

Figure 5:
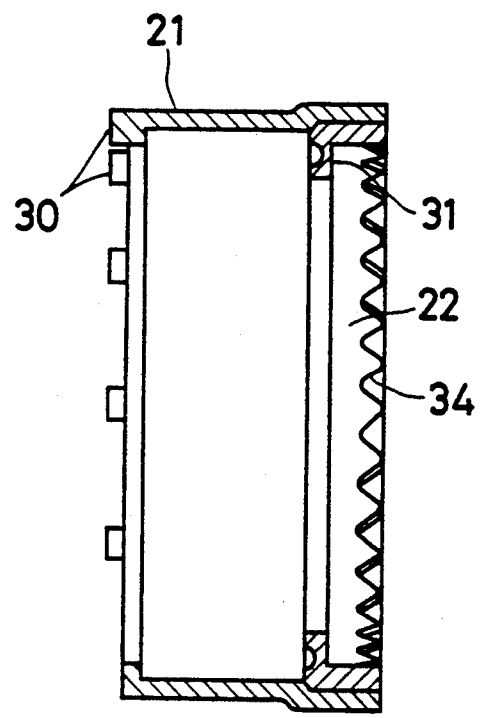
FIG. 5 is a sectional view of fixable rings.

As also shown in FIGS. 4 and 5, the first fixable ring 21 includes pins 30 formed integral with a forward end face thereof opposed to the projection 28. The pins 30 are sized to allow revolution of the recesses 29. The recesses 29 and pins 30, through mutual engagement, prevent rotation and allow only revolution of the input ring 20 when the first fixable ring 21 is fixed to the chuck body 11.

For fixing the second fixable ring 22 to the chuck body 11, the fixable ring 22 defines a vertical pressure contact surface 31 on an inside wall thereof, while the chuck body 11 defines a pressure contact surface 32 corresponding thereto. These pressure contact surfaces 31 and 32 move into pressure contact with each other when the nut ring 15 is turned in a tool tightening direction and the chuck claws 12 clamp the tool, resulting in a backlash to push the second fixable ring 22 through a bearing 33, whereby the second fixable ring 22 is fixed to the chuck body 11.

The second fixable ring 22 press fit in an inside wall of a rear end of the first fixable ring 21 defines teeth 34 on a circular rear end thereof. An elastic ring 36 is disposed on the rear end of the second fixable ring 22, the elastic ring 33 defining a plurality of elastic elements 35 for engaging the teeth 34.

Figure 6:
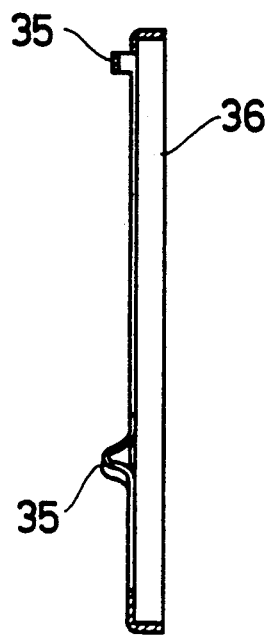
FIG. 6 is a sectional view of an elastic ring.
Figure 7:
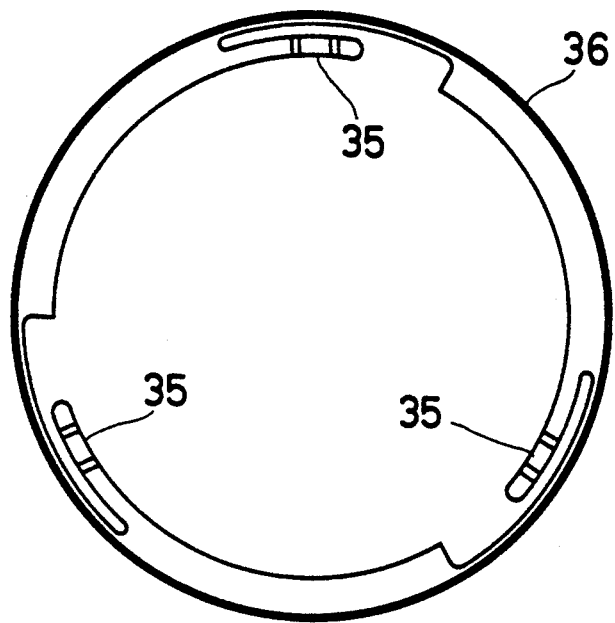
FIG. 7 is a right side view of the elastic ring.

As also shown in FIGS. 6 and 7, the elastic elements 35 are formed by cutting and bending the elastic ring 36 at three positions thereof. The elastic ring 36 is fixed in place with an outer peripheral surface thereof press fit in an inner peripheral surface of a rear end of the control ring 18. The elastic elements 35 are engageable with the teeth 34 of the second fixable ring 22 to apply a pressure thereto, thereby to release the second fixable ring 22 from pressure contact and to stop rotation of the latter.

A cover 37 is mounted on a rear portion of the chuck body 11, and the control ring 18 has a rear proximal end thereof opposed to the cover 37 and press fit to the cover 37.

The support ring 25 and an adjustor ring 40 constitute a variable torque limiter 41.

Figure 8:
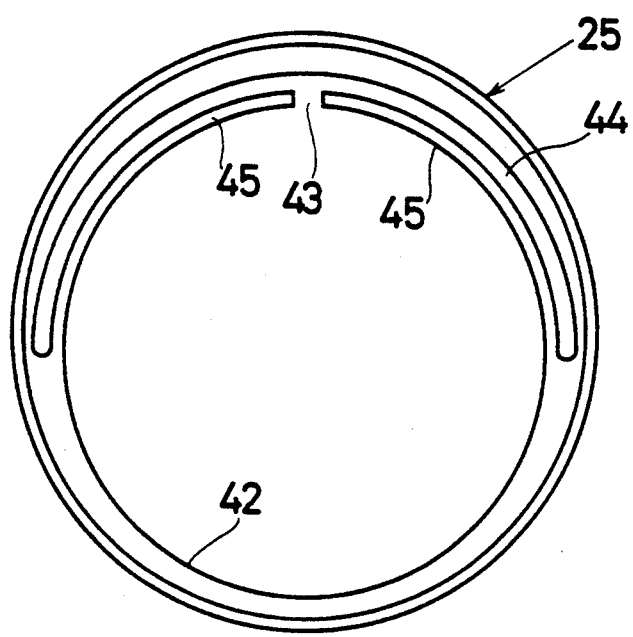
FIG. 8 is a right side view of a support ring.
Figure 9:
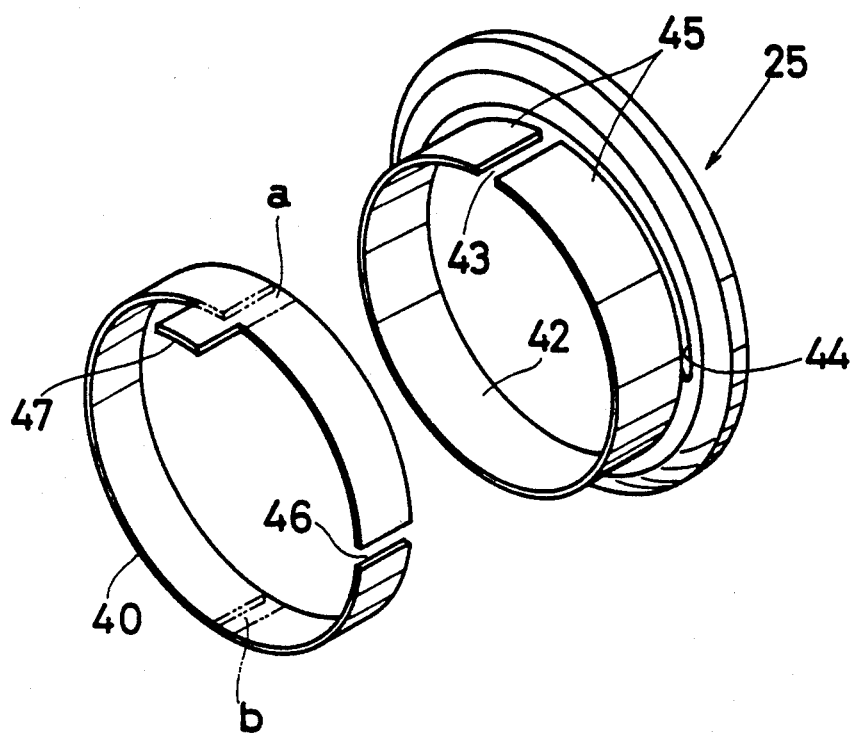
FIG. 9 is an exploded perspective view of a variable torque limiter.

As also shown in FIGS. 8 and 9, the support ring 25 includes a cylindrical portion 42 through which the support ring 25 is mounted on the chuck body 11. The cylindrical portion 42 defines an axial slot 43 for varying its engagement with the chuck body 11 in a direction to cause slips between the cycloidal gears 23 and 24 (a direction to separate meshed portions), and a semicircular slot 44 extending circumferentially of the cylindrical portion 42. Consequently, holder elements 45 are formed which are restorable to an original position by virtue of material elasticity.

The adjustor ring 40 is formed cylindrical from an elastic material to be restorable by the material elasticity, with an axial cut 46 in a peripheral position thereof, to elastically fit on the cylindrical portion 42 of the support ring 25. The adjustor ring 40 includes a control piece 47 formed integral therewith and extending outwardly of the control ring 18. The control piece 47 may be turned to move the cut 46 of the adjustor ring 40 relative to the slot 43 of the cylindrical portion 42, thereby to adjust the elasticity of the holder elements 45. This elasticity adjustment results in adjustment of the variable torque limiter 41.

More particularly, when the cycloidal gears 23 and 24 reduce revolution of the input ring 20 for output to the output ring 19, the cycloidal gears 23 and 24 receive a load from the output side that acts in a direction to disengage the cycloidal gears 23 and 24.

Figure 10:
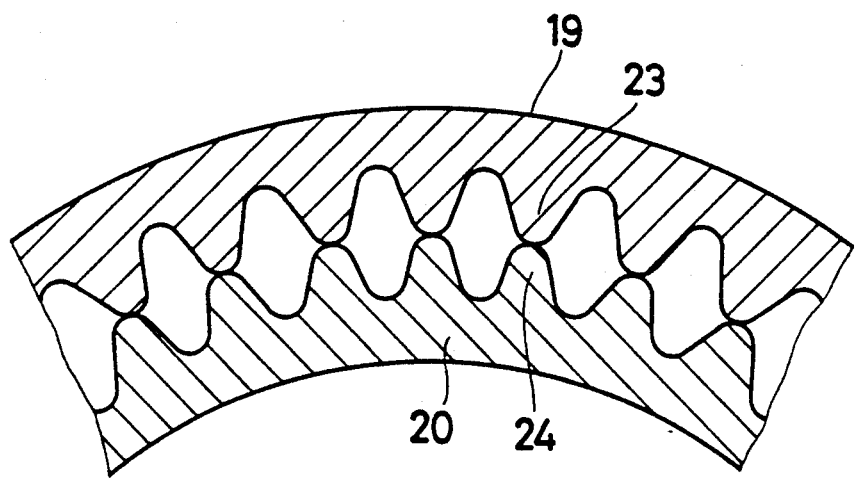
FIG. 10 is a fragmentary sectional right side view of cycloidal gears showing slipping thereof.

When, in this state, the load from the output side increases and presses the cycloidal gear 24 of the input ring 20, this pressure acts as a force to enlarge the slot 43 in the cylindrical portion 42 of the support ring 25 against the elasticity of the holder elements 45. When the slot 43 is enlarged against the elasticity of the holder elements 45, the cycloidal gear 24 of the input ring 20 moves in a direction to disengage from the cycloidal gear 23 of the output ring 19, that is the input ring 20 moves free from its retained position. Consequently, as shown in FIG. 10, the two cycloidal gears 23 and 24 become disengaged to produce slips therebetween, thereby acting as a torque limiter to break power transmission.

The slips between the cycloidal gears 23 and 24 occur smoothly since the gears 23 and 24 have teeth with rounded heads. Furthermore, since the gears 23 and 24 have a plurality of teeth in contact with one another, only a small load acts on a single thread. Thus, the gears 23 and 24 are free from damage, and only a minor noise is produced by the slips thereof.

When the adjustor ring 40 fitted on the holder elements 45 of the cylindrical portion 42 has the cut 46 overlapping the slot 43 formed in the cylindrical portion 42 (see phantom lines a in FIG. 9), the holder elements 45 impart a minimum retaining force (elasticity), i.e. the torque limiter is set to a minimum value.

Conversely, when the cut 46 of the adjustor ring 40 is at a maximum distance to the slot 43 in the cylindrical portion 42 (see phantom lines b in FIG. 9), the holder elements 45 impart a maximum retaining force (elasticity), i.e. the torque limiter is set to a maximum value.

The way in which the tool chuck 10 as constructed above operates will be described next.

Assume the chuck claws 12 are wide open to be ready to hold a tool. The control ring 18 is turned in a tightening direction for causing the chuck claws 12 to hold the tool 19 as placed thereamong.

Since, in an initial stage of this ring turning operation, the chuck claws 12 are free from the load resulting from the holding of tool. In this stage, the first and second fixable rings 21 and 22 of the torque amplifying mechanism 17 are connected to the chuck body 11 only through a small meshing resistance between the teeth 34 and elastic elements 35 to remain rotatable relative to the chuck body 11. Therefore the output ring 20, input ring 21 and fixable rings 21 and 22 are interconnected as a unit and are rotatable together. As a result, the rotation of the control ring 18 directly results in rotation of the nut ring 15, which provides a fast screw feed for projecting the chuck claws 12.

A load acts on the chuck claws 12 when the claws 12 contact the tool. This load causes a backlash of the nut ring 15, which rearwardly pushes nut ring 15 which, in turn, rearwardly pushes the second fixable ring 22 through the bearing 33.

As a result, the pressure contact surfaces 31 and 32 of the second fixable ring 22 and chuck body 11 move into pressure contact with each other. The second fixable ring 22 is then fixed to the chuck body 11, with the first fixable ring 21 also fixed, to place the torque amplifying mechanism 17 in an operable state.

That is, a further rotation of the control ring 18 causes revolution of the input ring 20. With this revolution, the difference in the number of teeth between the cycloidal gears 23 and 24 reduces the input and outputs a high torque to the output ring 19. The output ring 19 rotates the nut ring 15 with the high torque for projecting the chuck claws 12 and causing them to hold the tool with the high torque.

When the control ring 18 is turned in the tightening direction to hold the tool with a high torque, the load from the chuck claws 12 holding the tool acts in the direction to disengage the cycloidal gears 23 and 24. When the tightening force of the control ring 18 exceeds the elasticity of the holder elements 45 of the support ring 25 set through the adjustor ring 40, the holder elements 45 are spread out, enlarging the slot 43. Then the input ring 20 moves toward the center of the chuck body 11 to disengage the cycloidal gears 23 and 24 and cause slips therebetween. As a result, the variable torque limiter 41 operates to break the power transmission.

Thus, no force exceeding the above will be available for clamping the tool, thereby avoiding excessive tightening of the tool.

The tool clamping force is adjustable by operating the control piece 47 of the adjustor ring 40 to adjust setting of the variable torque limiter 41.

The tool is prevented from becoming loose during use since the elastic elements 35 are engaged with the teeth 34 at the rear end of the second fixable ring 22. This engagement avoids relaxation of the chuck claws 12 due to vibrations.

When releasing the tool, the control ring 18 needs only to be rotated in the relaxing direction.

In this case, the torque amplifying mechanism 17 is in operation as long as the pressure contact surfaces 31 and 32 of the second fixable ring 22 and chuck body 11 are in pressure contact. Consequently, rotation of the control ring 18 rotates the nut ring 15 with an increased torque, thereby reliably loosening the chuck claws 12 with a high torque.

When the nut ring 15 is freed from the backlash with loosening of the chuck claws 12, the elastic elements 35 of the elastic ring 36 push back the second fixable ring 22. As a result, the pressure contact surfaces 31 and 32 of the second fixable ring 22 and chuck body 11 move out of the pressure contact to render the torque amplifying mechanism 17 inoperative. The nut ring 15 then rotates at the same rate as the control ring 18 to screw-feed the chuck claws 12 fast in the relaxing direction. Thus, chuck claws 12 slide open to release the tool.

The nut ring 15 screw-feeds the chuck claws 12 until the screw feed is no longer possible, with the chuck claws 12 opened to a maximum extent. Then, a screw end of the chuck claws 12 and that of the nut ring 15 contact each other, which fixes the chuck claws 12 to the open state and also fixes the output ring 19.

However, since the second fixable ring 22 remains rotatable in the absence of the pressure contact as noted above, the revolution of the input ring 20 based on the rotation of the control ring 18 produces a rotation corresponding to the difference in the number of teeth between the cycloidal gears 23 and 24. This rotation causes idling of the fixable rings 21 and 22, thereby avoiding the chuck claws 12 being locked to the maximum open position due to the screw feed by the nut ring 15.

According to the first embodiment as described hereinbefore, excessive tightening of the tool is avoided to enable the tool to be removed by the manual operation (an operation to turn the chuck directly by hand).

The variable torque limiter 41 is formed by utilizing part of the reduction mechanism, in which the cycloidal gears 23 and 24 are slipped out of engagement. This construction has a simple construction with a small number of components, and is compact compared with a case of including an independent torque limiter.

In the described embodiment, the variable torque limiter 41 may be set to different values simply by adjusting the retaining force of the support ring 25 for holding the input ring 20 in the position for revolution.

This adjusting mechanism is small and simple, which is effective to avoid enlargement of the tool chuck.

(Second Embodiment)

FIGS. 11 through 17 show a tool chuck in a second embodiment of this invention.

The second embodiment includes a different example of torque amplifying mechanism. In the following description, therefore, the components 10–26 and 28–37 having the same functions as in the first embodiments are labeled with the same reference numerals and will not particularly be described again.

Figure 11:
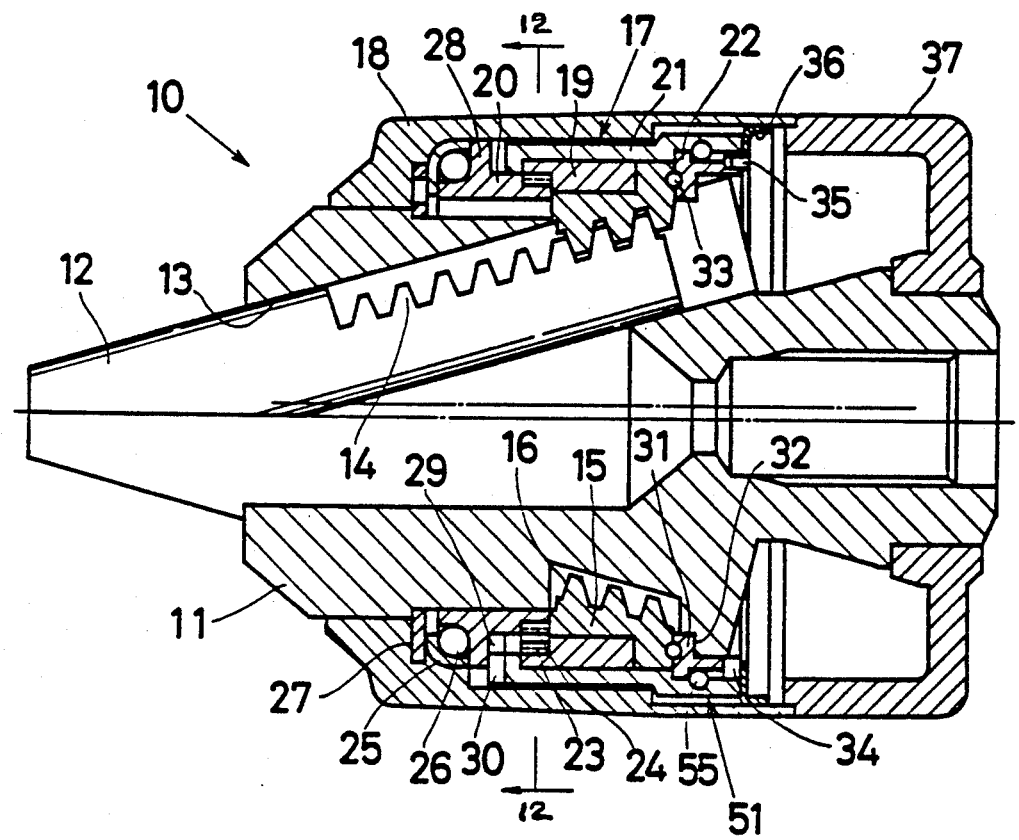
FIG. 11 is a sectional view of a tool chuck in a second embodiment of the invention.

Referring to FIG. 11, a torque amplifying mechanism 17 includes an output ring 19 press fit on and fixed to the nut ring 15, an input ring 20 relatively rotatably supported in the control ring 18 and off-centered by a predetermined amount of eccentricity e, and a first and a second fixable rings 21 and 22 movable into pressure contact with a rearward position of the chuck body 11. These annular elements 19, 20, 21 and 22 are arranged axially of the chuck body 11.

The nut ring 15 consists of two parts which are rigidly interconnected by press fitting the output ring 19 after the two parts are assembled to the chuck body 11.

Figure 12:
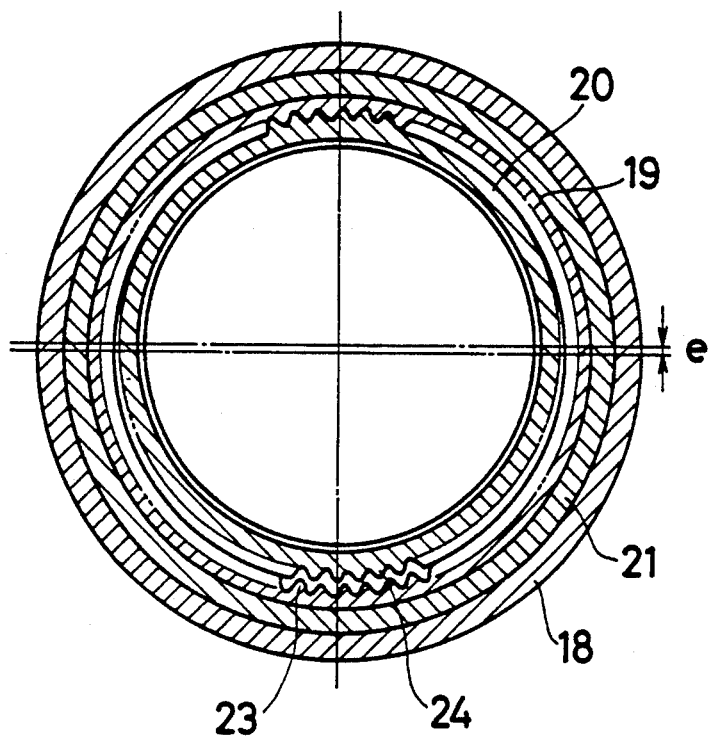
FIG. 12 is a section taken on line B—B of FIG. 11.

As also shown in FIG. 12, the output ring 19 has a forward end projecting forwardly of the nut ring 15, and the inner periphery of this projecting portion and the outer periphery of a rear end of the input ring 20 overlap each other in an eccentric relationship. These overlapping portions define cycloidal gears 23 and 24 having different numbers of teeth and meshed with each other.

For example, the gear 23 on the output ring 19 has 63 teeth, while the teeth 24 on the input ring 20 has 61 teeth, the difference in the number of teeth being 2. Thus, these gears 23 and 24 constitute cycloidal gears for making a cycloidal movement.

When the control ring 18 is turned to apply only a revolving force to the input ring 20 (as locked against rotation) based on its eccentricity relative to the control ring 18, the output ring 19 will rotate by an amount corresponding to the greater number of teeth of the gear 23 formed thereon than the gear 24 formed on the input ring 20, the difference being 2 as noted above. This results in a substantial reduction of rotation of the control ring 18, which is outputted as a greatly increased torque from the output ring 19 in rotation.

Where, as described above, the difference in the number of teeth is 2 between the 63 teeth in the gear 23 formed on the output ring 19 and 61 teeth in the gear 24 formed on the input ring 20, the reduction ratio is expressed by the following equation:

$$(63-61)/61 = 2/61 = 1/30.5.$$

This is a large reduction ratio with respect to input, resulting in a greatly amplified torque output from the output ring 19.

The input ring 20 has a forward end peripherally contacting a bearing 26 enveloped in a support ring 25. Thus, the support ring 25 is inserted in its entirety into the control ring 18, in contact with an inner peripheral wall of the latter. Numeral 27 in FIG. 11 denotes an E-ring.

As distinct from the first fixable ring 21 and second fixable ring 22 in the first embodiment which are fixed to each other by press fitting, the first fixable ring 21 and second fixable ring 22 in the second embodiment are relatively rotatably fitted to each other. That is, the second fixable ring 22 is relatively rotatably mounted in contact with the inner peripheral surface of the rear end of the first fixable ring 21. A torque limiter 51 different from the variable torque limiter 41 in the first embodiment is interposed between the two rings 21 and 22.

Figure 13:
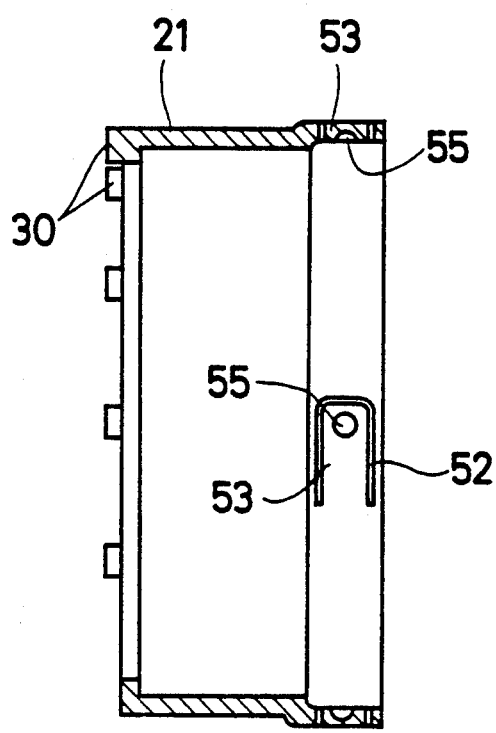
FIG. 13 is a sectional view of a first fixable ring.
Figure 14:
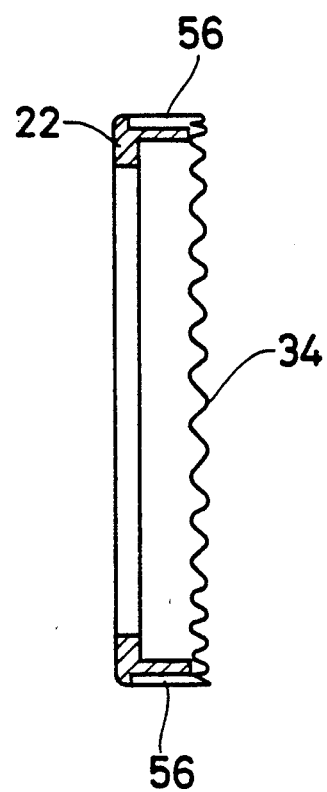
FIG. 14 is a sectional view of a second fixable ring.
Figure 15:
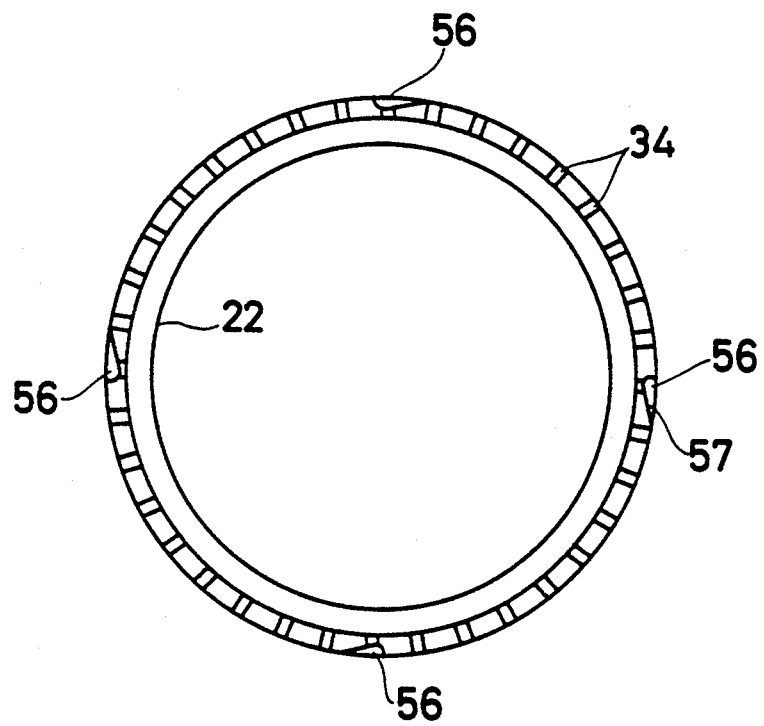
FIG. 15 is a right side view of the second fixable ring.

As also shown in FIGS. 13, 14 and 15, the first fixable ring 21 has U-shaped cuts 52 defining elastic pieces 53 at four peripheral positions at a rear end thereof. Each elastic piece 53 has a recess 55 formed in an inside wall thereof for receiving about half of a ball 54.

The second fixable ring 22 has cam recesses 56 form in outer peripheries (4 positions) thereof opposed to the recesses 55 of the elastic pieces 53, each for receiving half of the ball 54. Each of these cam recesses 56 has a vertical surface at one end thereof circumferentially of the second fixable ring 22, and a gently inclined surface at the other end.

Figure 16:
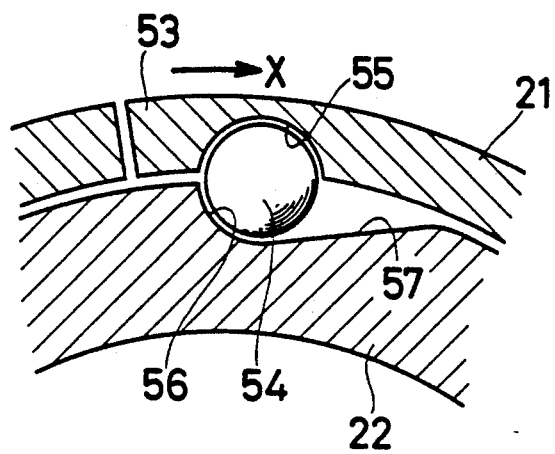
FIG. 16 is an enlarged fragmentary side view of a torque limiter.
Figure 17:
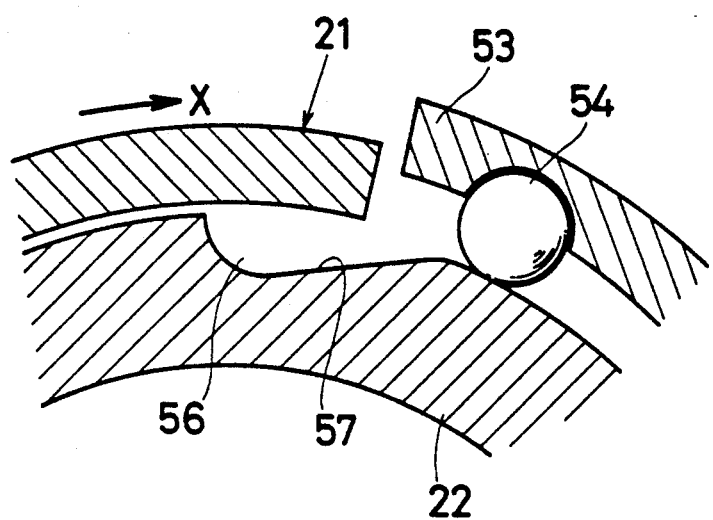
FIG. 17 is an enlarged fragmentary side view of the torque limiter in an operative state.

When, as also shown in FIGS. 16 and 17, a tightening force overcoming the combination of each inclined surface 47 and the elasticity of each elastic piece 53 is applied to the torque limiter 51 in a direction X for tightening the chuck claws 12, the ball 57 will move up the inclined surface 57 to the peripheral surface of the second fixable ring 22, thereby nullifying the force.

However, with rotation in a direction to relax the chuck claws 12 (opposite of the X direction), the ball 54 contacts the vertical surface of the cam recess 56 and remain in the cam recess 56. In this state, the torque limiter is inoperative.

The way in which the tool chuck 10 as constructed above operates will be described next.

When the control ring 18 is turned in the tightening direction with a tool placed among the chuck claws 12, the output ring 20, input ring 21 and fixable rings 21 and 22 of the torque amplifying mechanism 17 which are interconnected as a unit are rotated together in the initial stage of the turning operation since the chuck claws 12 are free from the load resulting from the holding of tool. As a result, the rotation of the control ring 18 directly results in rotation of the nut ring 15, which provides a fast screw feed for projecting the chuck claws 12 as in the first embodiment.

A load acts on the chuck claws 12 when the claws 12 contact the tool. This load causes a backlash of the nut ring 15, which rearwardly pushes nut ring 15 which, in turn, rearwardly pushes the second fixable ring 22 through a bearing 40. As a result, the pressure contact surfaces 31 and 32 of the second fixable ring 22 and chuck body 11 move into pressure contact with each other. The second fixable ring 22 is then fixed to the chuck body 11, with the first fixable ring 21 also fixed, to place the torque amplifying mechanism 17 in an operable state, as in the first embodiment.

That is, a further rotation of the control ring 18 causes revolution of the input ring 20. With this revolution, the difference in the number of teeth between the cycloidal gears 23 and 24 reduces the input and outputs a high torque to the output ring 19. The output ring 19 rotates the nut ring 15 with the high torque for projecting the chuck claws 12 and causing them to hold the tool with the high torque.

When the control ring 18 is turned in the tightening direction to hold the tool with a high torque, the rotational load is applied to the first fixable ring 21 as a rotational load in the tightening direction X as shown in FIG. 16. When this rotational load exceeds the elasticity of the elastic pieces 53 of the torque limiter 51, the balls 54 move out of the cam recesses 56 against the elasticity of the elastic pieces 53, to slide on the outer peripheral surfaces of the second fixable ring 22. Thus, the torque limiter 51 operates to allow rotation of the first fixable ring 21.

When rotation of the first fixable ring 21 is allowed as above, the first fixable ring 21 rotates with the input ring 20. Then the input ring 20 rotates without revolving, to render the torque amplifying mechanism 17 inoperative. Since the input ring 20 just rotates with the gear 24 thereof moving over the gear 23 of the output ring 19, there occurs no torque transmission and no high torque tightening. Consequently the tool is clamped with a tightening force set through the torque limiter 51, thereby avoiding excessive tightening.

When releasing the tool, the control ring 18 needs only to be rotated in the relaxing direction.

In this case, the torque amplifying mechanism 17 is in operation as long as the pressure contact surfaces 31 and 32 of the second fixable ring 22 and chuck body 11 are in pressure contact. Consequently, rotation of the control ring 18 rotates the nut ring 15 with an increased torque. In addition, as shown in FIG. 16, the force is applied in the relaxing direction opposite to the direction X, with each ball 54 contacting the vertical surface of the cam recess 56. Since each ball 54 cannot move out of the recess 56, the torque limiter 51 is inoperative.

Thus, the rotation of the control ring 18 in the relaxing direction results in a high torque applied to the nut ring 15 in the absence of slips of the torque limiter 51, thereby reliably loosening the chuck claws 12 with a high torque.

When the nut ring 15 is freed from the backlash with loosening of the chuck claws 12, the elastic elements 35 of the elastic ring 36 push back the second fixable ring 22. As a result, the pressure contact surfaces 31 and 32 of the second fixable ring 22 and chuck body 11 move out of the pressure contact to render the torque amplifying mechanism 17 inoperative. The nut ring 15 then rotates at the same rate as the control ring 18 to screw-feed the chuck claws 12 fast in the relaxing direction. Thus, chuck claws 12 slide open to release the tool.

According to the second embodiment, as described above, excessive tightening of the tool is avoided to enable the tool to be removed by a manual operation. For removing the tool, the chuck claws 12 are relaxed with a sufficient force not limited by the torque limiter 51.

The torque limiter 51 is formed in the fixable rings 21 and 22, which lends to a compact construction.

What is claimed is:

1. A tool chuck having a plurality of inclined chuck claws mounted centrally of a forward end of a chuck body to be slidable toward and away from one another, a nut ring meshed with the chuck claws and rotatable to screw-feed the chuck claws toward and away from one another, a revolvable input ring loosely eccentrically mounted in a control ring fitted to an outer peripheral surface of the chuck body, an output ring fixed to the nut ring, a fixable ring fixable under pressure to the chuck body by a backlash produced by tightening of the nut ring, the input ring, the output ring and the fixable ring being arranged axially of the chuck body, a forward end of the fixable ring extending to the input ring such that opposed surfaces thereof are engageable to allow revolution and restrict rotation of the input ring, and an inbuilt torque amplifying mechanism with gears having different numbers of teeth and formed on portions of the input ring and the output ring overlapping each other in an eccentric relationship, said tool chuck comprising:
   a support ring for relatively rotatably supporting said input ring, said support ring including a holder portion supported on said chuck body; and
   an enlargement allowing portion formed in said holder portion for varying a supporting position in a direction to cause slipping of engagement between said gears.

2. A tool chuck as claimed in claim 1, further comprising adjusting means mounted on said holder portion of said support ring for variably adjusting a retaining force of said holder portion.

3. A tool chuck having a plurality of inclined chuck claws mounted centrally of a forward end of a chuck body to be slidable toward and away from one another, a nut ring meshed with the chuck claws and rotatable to screw-feed the chuck claws toward and away from one another, a revolvable input ring loosely eccentrically mounted in a control ring fitted to an outer peripheral surface of the chuck body, an output ring fixed to the nut ring, a fixable ring fixable under pressure to the chuck body by a backlash produced by tightening of the nut ring, the input ring, the output ring and the fixable ring being arranged axially of the chuck body, a forward end of the fixable ring extending to the input ring such that opposed surfaces thereof are engageable to allow revolution and restrict rotation of the input ring, and an inbuilt torque amplifying mechanism with gears having different numbers of teeth and formed on portions of the input ring and the output ring overlapping each other in an eccentric relationship, said tool chuck being characterized in that:
   said fixable ring is divided into two rings; and
   a torque limiter is interposed between opposed surfaces of said two rings to limit a force transmitted in a direction to tighten said nut ring to a predetermined value.

4. A tool chuck as claimed in claim 3, characterized in that:
   said two fixable rings are fitted together to be rotatable relative to each other;
   one of said two fixable rings are cut to define elastic pieces arranged circumferentially of a portion thereof fitted to the other fixable ring;
   each of said elastic pieces defining a recess for receiving part of a ball; and
   the other fixable ring defines cam recesses in positions opposed to the balls for receiving part of the balls, each of said recesses including an inclined surface at a side thereof circumferentially of said other fixable ring for acting to tighten said chuck claws, and a vertical surface at a side for acting to relax said chuck claws.

* * * * *